(12) United States Patent
Mercer

(10) Patent No.: US 8,384,738 B2
(45) Date of Patent: Feb. 26, 2013

(54) COMPOSITING WINDOWING SYSTEM

(75) Inventor: Paul Mercer, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1212 days.

(21) Appl. No.: 12/203,098

(22) Filed: Sep. 2, 2008

(65) Prior Publication Data

US 2010/0058229 A1    Mar. 4, 2010

(51) Int. Cl.
*G09G 5/00* (2006.01)
*G09G 5/36* (2006.01)
*G06T 15/40* (2006.01)

(52) U.S. Cl. ........ 345/629; 345/421; 345/619; 345/620; 345/624; 345/545

(58) Field of Classification Search .................. None
See application file for complete search history.

(56) References Cited

U.S. PATENT DOCUMENTS

| | | | |
|---|---|---|---|
| 5,241,656 A * | 8/1993 | Loucks et al. | 715/794 |
| 5,245,702 A | 9/1993 | McIntyre et al. | |
| 5,430,838 A | 7/1995 | Kuno et al. | |
| 5,805,163 A | 9/1998 | Bagnas | |
| 5,949,432 A | 9/1999 | Gough et al. | |
| 6,016,150 A * | 1/2000 | Lengyel et al. | 345/426 |
| 6,549,218 B1 | 4/2003 | Gershony et al. | |
| 7,330,192 B2 | 2/2008 | Brunner et al. | |
| 2005/0259032 A1 * | 11/2005 | Morris | 345/1.1 |
| 2006/0294475 A1 | 12/2006 | Holecek et al. | |
| 2007/0101282 A1 * | 5/2007 | Goossen et al. | 715/764 |
| 2008/0284798 A1 * | 11/2008 | Weybrew et al. | 345/630 |

FOREIGN PATENT DOCUMENTS

JP        03223791        10/1991

OTHER PUBLICATIONS

Extended European Search Report, European Application No. 09811897.9, Date Issued: May 7, 2012, pp. 1-6.
International Search Report and Written Opinion, International Application No. PCT/US2009/051453, Date of Mailing: Jan. 29, 2010, pp. 1-7.

* cited by examiner

*Primary Examiner* — Ke Xiao
*Assistant Examiner* — Donna Ricks

(57) ABSTRACT

A set of buffers is made available on a system-wide basis to provide capabilities for robust presentation of windows. The buffers can include a frame buffer, a system off-screen buffer and a compositing buffer.

Windows are analyzed to determine and implement the most time-and memory-efficient use of the available buffers to properly display the intended result. In some situations, applications write directly to the frame buffer. Clipping can be used to prevent occluded portions of windows from being displayed. In other situations, some data is written to the off-screen buffer and/or to one or more application buffers, and the compositing buffer is used to perform compositing operations.

Thus, a device can provide a wide range of display capabilities, including window compositing, while minimizing costs in terms of memory usage and processing power. Such advantages are of particular use in mobile devices and other systems having limited resources.

21 Claims, 12 Drawing Sheets

COMPOSITING WINDOWING SYSTEM

CROSS-REFERENCE TO RELATED APPLICATION

The present application is related to U.S. patent application Ser. No. 12/132,498, filed Jun. 3, 2008 for "Selective Access to a Frame Buffer,", the disclosure of which is incorporated herein by reference.

FIELD OF THE INVENTION

In various embodiments, the present invention relates to systems for displaying data in an electronic device, and more particularly to a windowing system that makes efficient use of buffers in order to display windows having various interrelationships with one another.

DESCRIPTION OF THE RELATED ART

It is well known to provide a buffer to store display data for display in a windowing system. A windowing system is a software system that permits application sharing of a display. One example of such a windowing system is a desktop comprising an electronic representation of a workspace in which windows are spawned for specific applications to display output.

A frame buffer is typically used by a computing system to temporarily store display data before it is shown on a screen. Typically, a frame buffer is an area of memory sufficiently large to allow storage of a color value for each pixel to be displayed on the screen. An application (or the operating system) writes display data to the frame buffer, and then a display subsystem generates visual output based on the contents of the frame buffer.

Conventionally, in some systems, an application can write display data directly to a frame buffer. Such an arrangement can be used, for example, when a single window occupies the entire screen. Direct writing to the frame buffer can also be used for displaying multiple windows, if clipping is available to ensure that one window does not draw in a location where it is supposed to be occluded by another window. Clipping is a well-known technique wherein only those parts of the display data that are intended to be visible to the viewer are drawn; thus, occluded portions of windows are not drawn.

However, such direct writing to a frame buffer does not provide satisfactory results in systems that do not support clipping. In addition, direct writing to a frame buffer does not facilitate the display of data that involves compositing two or more windows together, for example to display a semi-transparent window that overlays another window.

Accordingly, in some systems, applications do not write directly to the frame buffer, but rather write display data to an off-screen buffer so that further processing, such as compositing, can be performed before the data is copied to the frame buffer. In general, each application has an off-screen buffer. The applications write display data to their respective off-screen buffers; then a windowing system performs whatever compositing and/or other operations are needed, and then writes the result to the frame buffer for display.

One problem with such prior art schemes is that they introduce significant complexity to the display process. The additional operations of writing to an off-screen buffer and then performing compositing and copying operations to generate data for the frame buffer can be time-consuming and computationally expensive. In addition, large amounts of memory must be made available so that each application has an off-screen buffer for receiving display data.

Such limitations are of particular concern for mobile devices that may have limited memory and or processing capability. For example, it may be difficult, using conventional techniques, to provide robust multiple window displays on such devices without consuming an excessive amount of system resources. In addition, such devices may lack the capability to perform clipping operations when writing to a frame buffer, thus making it difficult or impossible to display multiple overlapping windows without using a separate off-screen buffer for output sourced from each application.

What is needed is a method and system for enabling compositing of windows in an efficient manner, while avoiding the limitations of the above-described systems. What is further needed is a method and system that provides the ability to display multiple overlapping windows, with or without compositing, in devices that have limited resources, such as mobile devices.

SUMMARY OF THE INVENTION

According to the techniques of the present invention, in various embodiments a set of buffers is made available on a system-wide basis to provide capabilities for robust presentation of windows in a computer system. In addition to a frame buffer, at least two additional buffers are provided: a system off-screen buffer and a compositing buffer. According to various embodiments, the architecture of the present invention allows a device to provide a wide range of display capabilities, including window compositing capabilities, while minimizing costs in terms of memory usage and processing power.

In one embodiment, a windowing system makes efficient use of the available buffers by determining which buffer or buffers are needed for particular situations, as follows. For each geometric arrangement of on-screen elements (such as windows), a determination is made as to which buffer or buffers should be used. In one embodiment, the invention does not make such a determination unless the geometric arrangement changes, resulting in a different set of relationships among on-screen elements. Thus, for example, if a window is moved so that it overlaps another window that was not previously overlapped, the system in one embodiment would make a determination as to which buffer or buffer to use. However, if the contents of a window change but the geometric arrangement of windows remains unchanged, no such determination would be made in one embodiment.

When a window is to be displayed without any occlusions, the application writes the contents of the window directly to the frame buffer.

When a window is to be displayed with an opaque occlusion, the application writes the non-occluded contents of the window directly to the frame buffer. Clipping is employed to prevent the occluded portion of the window from being displayed.

When a window C is to be drawn with transparency, translucency, or another visual effect over a window D, the compositing buffer is used as a working area. Window D is written to the system off-screen buffer. Window C is written to an application window buffer that is devoted to the particular application responsible for Window C. Objects within windows C and D that are affected by the visual effect are composited together, using alpha compositing or some other effect, in the compositing buffer. The result is then copied to the frame buffer. For greater efficiency, any changes that take place to objects of windows C or D not affected by the visual effect may be written directly to the frame buffer since no compositing need be done.

The technique of applying visual effects in this manner can be used for per-pixel transparency (wherein each pixel of the window has its own degree of transparency), or constant transparency (wherein the entire window has the same degree of transparency), or other visual effects such as blur or the like.

Additional effects such as rotation and blur can also be achieved at minimal cost, using the techniques of the present invention according to various embodiments.

One specialized form of visual effect is a shadow effect around the borders of a window. According to one embodiment of the invention, when a window A is to be displayed with a shadow effect that intersects another window B, the application writes window A directly to the frame buffer. Window B is written to the system off-screen buffer and composited into the compositing buffer along with the shadow effect. Then window B is copied, with the shadow effect, from the compositing buffer to the frame buffer. Clipping can be used to ensure that only the visible part of window B is copied. Multiple overlapping windows with shadows can all be handled by the single system off-screen buffer and compositing buffer.

Advantageously, in various embodiments, the present invention analyzes the windows being displayed at any given time to determine and implement the most time- and memory-efficient use of the available buffers to properly display the intended result. In various embodiments, the present invention also avoids the need for individual working buffers for each application, in many situations, as the system off-screen buffer can be made available to all applications. In various embodiments, the invention thereby improves efficiency, increases processing speed, and reduces memory use. Such advantages are of particular use in mobile devices and other systems having limited resources.

BRIEF DESCRIPTION OF THE DRAWINGS

The accompanying drawings illustrate several embodiments of the invention and, together with the description, serve to explain the principles of the invention in various embodiments. One skilled in the art will recognize that the particular embodiments illustrated in the drawings are merely exemplary, and are not intended to limit the scope of the present invention.

DETAILED DESCRIPTION OF THE EMBODIMENTS

Figure 1:
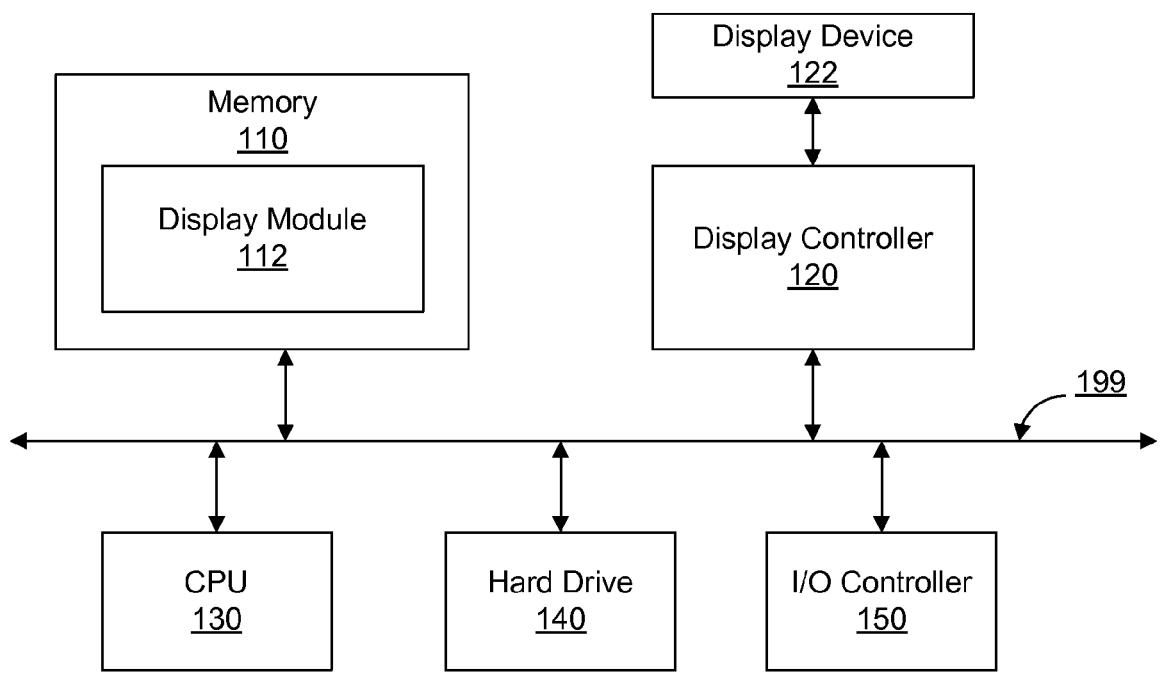
FIG. 1 is a block diagram depicting a system architecture for practicing the present invention according to one embodiment.

Referring now to FIG. 1, there is shown a block diagram depicting a system architecture for practicing the present invention according to one embodiment. Memory 110, display controller 120, central processing unit (CPU) 130, hard drive 140 and I/O controller 150 are communicatively coupled with one another by bus 199 according to well known computing techniques. Memory 110 includes buffers to be used for temporary storage of display data, as described in more detail below. Memory 110 comprises display module 112, which includes components for buffering and processing display data, as will be described in more detail below. Display device 122, such as a display screen for a computing device, is communicatively coupled to display controller 120. CPU 130 performs general tasks related to running an operating system and applications, as is well known in the art. Display controller 120 can be a video graphics card and can perform video-specific tasks such as rendering a desktop display, rendering output video, and the like.

In one embodiment, the system architecture shown in FIG. 1 is implemented as a personal computer (PC) or portion thereof. In other embodiments, the system architecture can be implemented in any device that displays video, such as a cell phone, television, handheld computer, personal digital assistant (PDA), or the like. The various components shown in FIG. 1 can be centralized in a single device or distributed across several devices.

Figure 2:
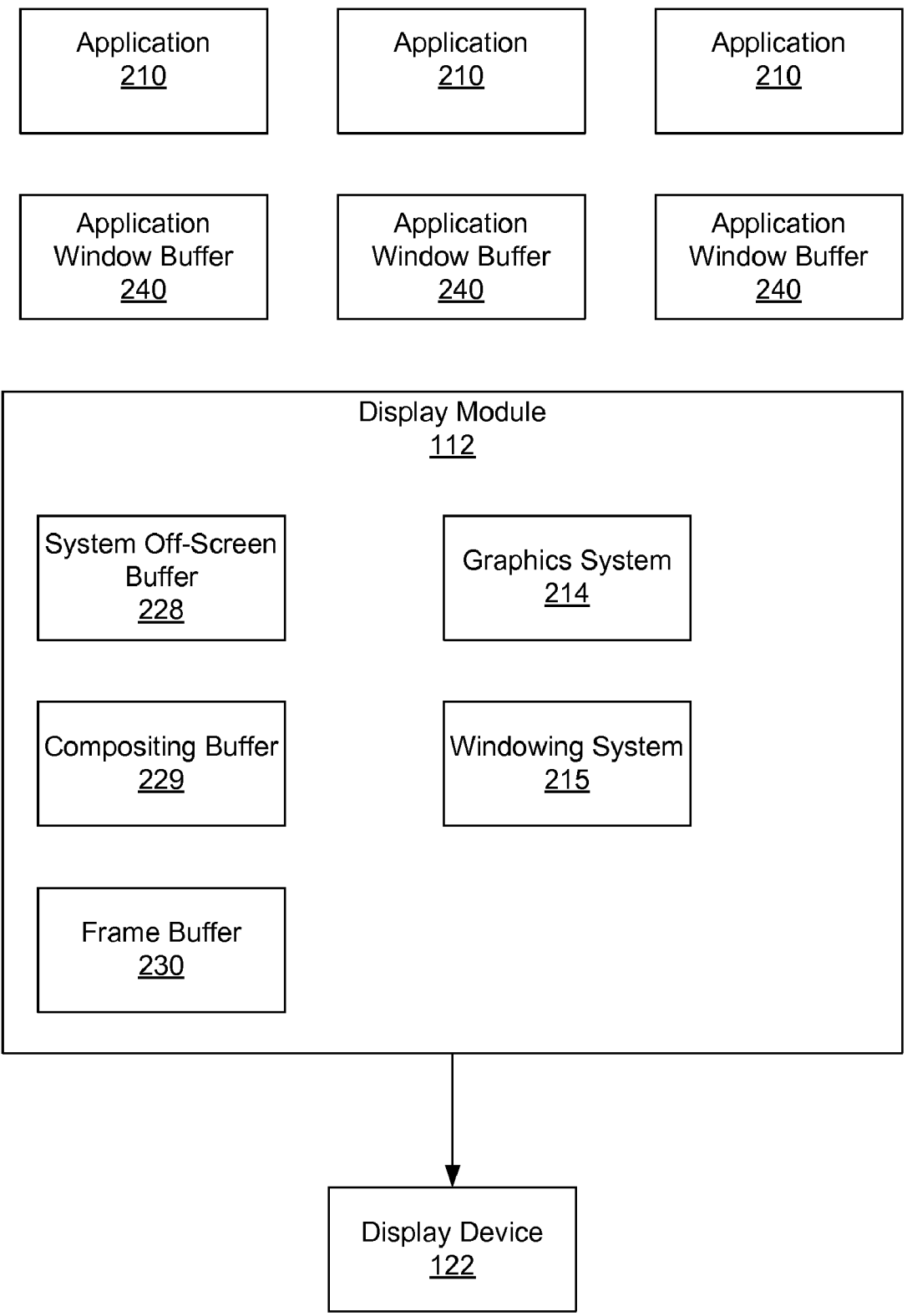
FIG. 2 is a block diagram depicting a display module architecture, according to one embodiment.

Referring to FIG. 2, there is shown a block diagram depicting a display module 112 architecture according to one embodiment. Applications 210 generate windows containing display data to be presented on display device 122. Each application 210 can potentially have an application window buffer 240, although, as will be described in more detail below, in many cases such application window buffers 240 are not necessary for all applications 210.

In one embodiment, three buffers are provided for system-wide use. Each buffer is implemented as an area of memory to which display data can be written. Frame buffer 230 is used as a final destination for display data to be presented by display device 122. Once data has been written to frame buffer 230, display device 122 (and display controller 120, if applicable) can read the data and present it to the user. Compositing buffer 229 is used for compositing display data from two or more sources. System off-screen buffer 228 is used as a temporary storage space for display data to be copied to one of the other buffers 229 or 230. As described in more detail below, different combinations of buffers 228, 229, 230 are used in different situations, so as to maximize efficiency and minimize undue use of system resources.

As will be recognized by one skilled in the art, additional buffers may also be provided to enable additional functionality.

Display module 112 includes graphics system 214 for generating display data within windows. Display module 112 also includes windowing system 215, which determines which buffers 228, 229, 230 will be used by which applications 210, and handles interactions among windows.

One skilled in the art will recognize that the architecture set forth in FIGS. 1 and 2 is merely exemplary, and that the present invention can be implemented in various embodiments using different architectures than those depicted and described herein. In particular, some buffers need not be present for all types of display situations, as will be apparent from the following description.

In some embodiments, parts of display module 112 can be implemented in hardware, or in software outside of the memory 110. For example, any of buffers 228, 229, 230 and/or 240 can be located in display controller 120 or in other locations. One skilled in the art will recognize that many other layouts and architectures are possible without departing from the essential characteristics of the invention.

Each buffer 228, 229, 230 and/or 240 can be a single buffer or a collection of partitioned buffers (e.g., a buffer for each window, a buffer for each video frame, or the like). In one embodiment, buffers exists in RGB configuration in which a dedicated buffer for each video color of red, green, and blue. In another embodiment, one buffer stores an RGB frame and another buffer stores a YUV frame, until the frames being combined for output.

Each application 210 can be a third-party or external application, or an application that is integrated with an operating system. One skilled in the art will recognize that the present invention in various embodiments can also be implemented for use by operating system components that generate windows, and is not strictly limited to applications.

The invention is described herein in the context of an embodiment wherein visual elements are displayed in a desktop metaphor, as is common in many window-based user interfaces. However, one skilled in the art will recognize that this description is merely illustrative, and that in various embodiments the present invention can be implemented in other contexts as well.

Figure 3A:
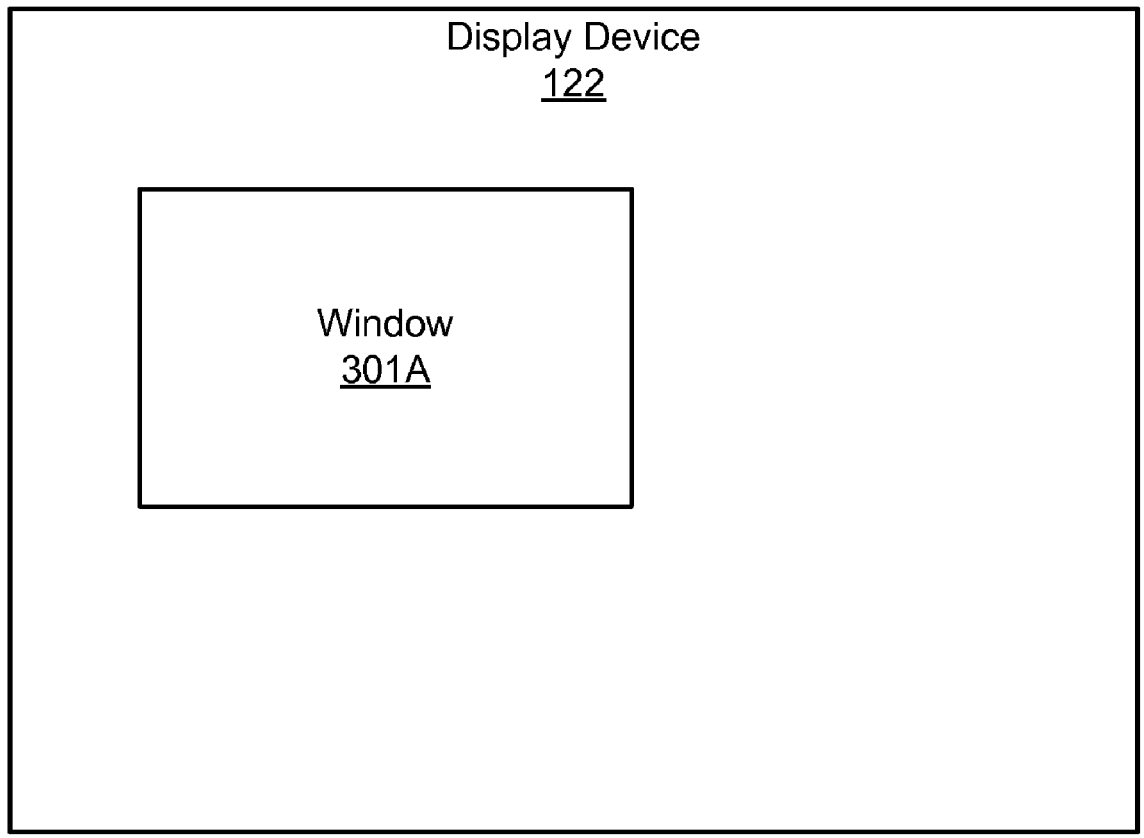
FIG. 3A depicts an example of a single window on a display screen, according to one embodiment.
Figure 3B:
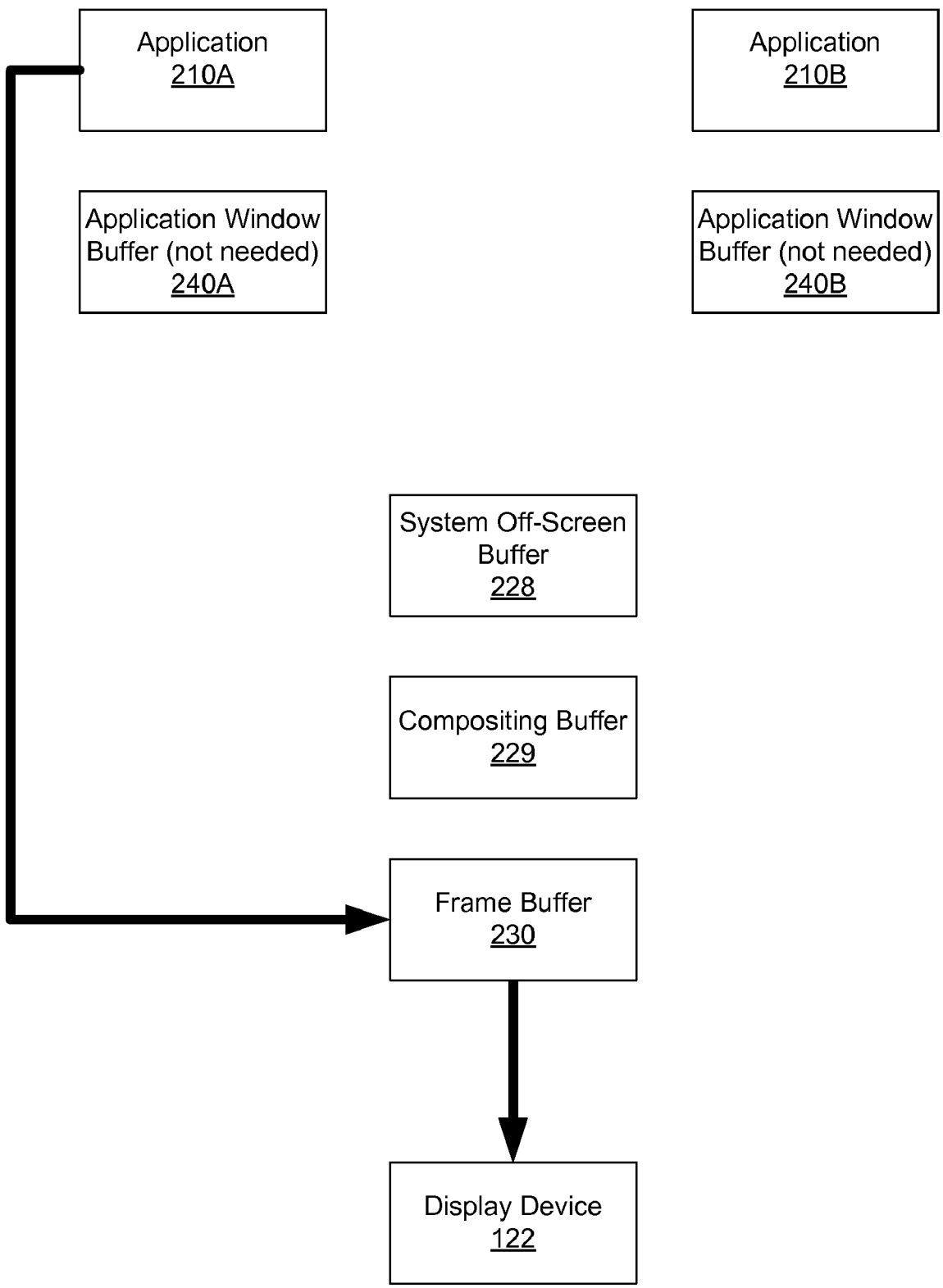
FIG. 3B is a block diagram depicting a process for drawing a single window, according to one embodiment.

Referring now to FIG. 3A, there is shown an example of a single window 301A on a display screen 122, according to one embodiment. Referring also to FIG. 3B, there is shown a block diagram depicting a process for drawing a single window, according to one embodiment. For clarity, some components are omitted from FIG. 3B, while some components (such as system off-screen buffer 228, compositing buffer 229, and application 210B) are shown even though they are not used in the situation depicted.

When a window 301A is to be displayed without any occlusions, as depicted in FIG. 3A, application 210A writes the contents of window 301A directly to frame buffer 230. Display device 122 then reads frame buffer 230 when displaying output for the user. FIG. 3B depicts this case by including arrows from application 210A directly to frame buffer 230, and from frame buffer 230 to display device 122. In this manner, the system of the present invention in one embodiment is able to generate output at display device 122 with minimal use of system resources such as buffers and processing power. Only the frame buffer 230 is used, without any need to write to an application window buffer 240, system off-screen buffer 228, or compositing buffer 229.

Figure 4A:
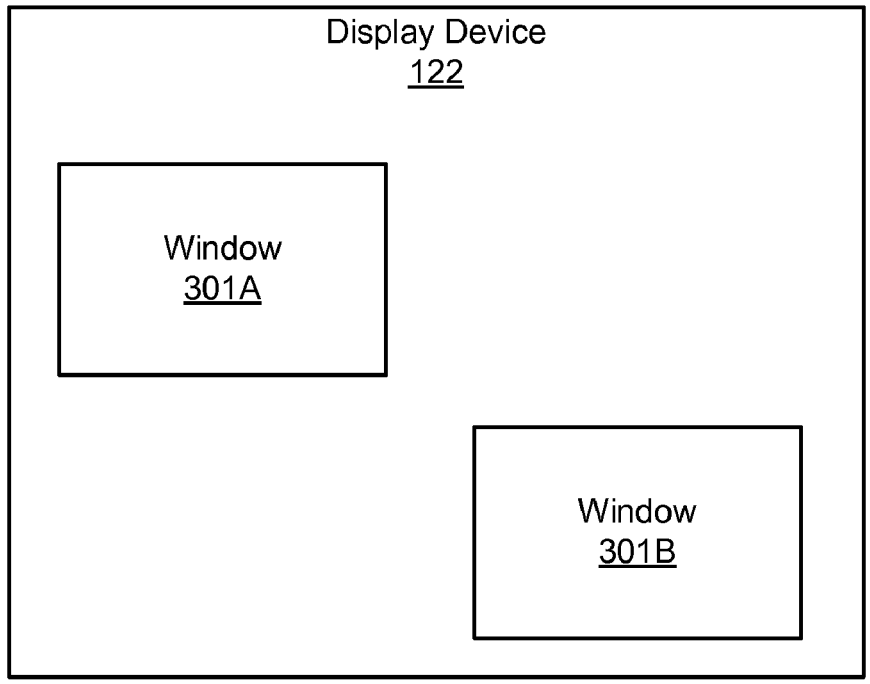
FIG. 4A depicts an example of two non-overlapping windows on a display screen, according to one embodiment.
Figure 4B:
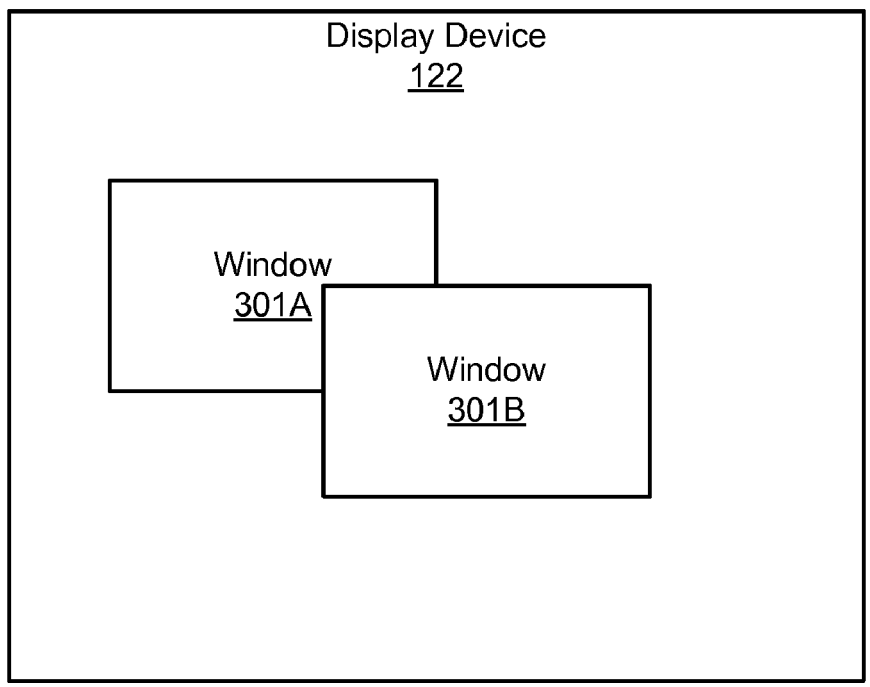
FIG. 4B depicts an example of an opaque window overlapping a portion of another window on a display screen, according to one embodiment.
Figure 4C:
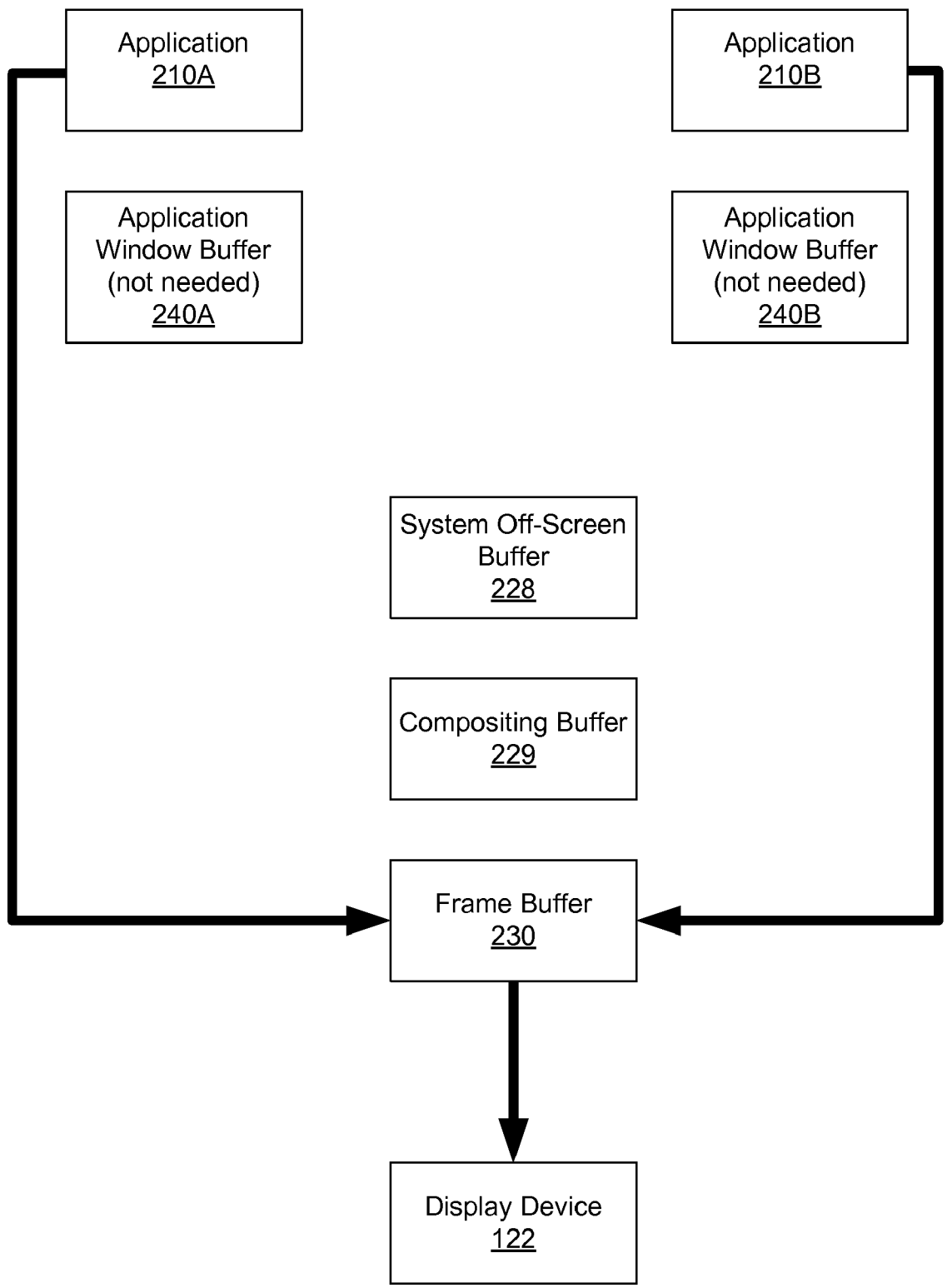
FIG. 4C is a block diagram depicting a process for drawing two windows, according to one embodiment.

Referring now to FIG. 4A, there is shown an example of two non-overlapping windows 301A, 301B on a display screen 122, according to one embodiment. Referring also to FIG. 4B, there is shown an example of an opaque window 301B overlapping a portion of another window 301A on a display screen, according to one embodiment. Referring also to FIG. 4C, there is shown a block diagram depicting a process for drawing the examples of FIGS. 4A and 4B, according to one embodiment. For clarity, some components are omitted from FIG. 4B, while some components (such as system off-screen buffer 228, compositing buffer 229, and application 210B) are shown even though they are not used in the situation depicted.

When two non-overlapping windows 301A, 301B are to be displayed, as depicted in FIG. 4A, each application 210A, 210B writes the contents of its corresponding window 301A, 301B directly to frame buffer 230. Similarly, when an opaque window 301B overlaps a portion of an object in another window 301A, as depicted in FIG. 4B, each application 210A, 210B writes the contents of its corresponding window 301A, 301B directly to frame buffer 230. Clipping can be employed to prevent the overlapped region of the window 301A object from being written to frame buffer 230. In this manner, no additional buffers need be used when displaying overlapping opaque windows as shown in FIG. 4B. Since no compositing is needed, compositing buffer 229 and system off-screen buffer 230 need not be used.

Display device 122 reads frame buffer 230 when displaying output for the user.

FIG. 4C depicts this case by including arrows from applications 210A, 210B directly to frame buffer 230, and from frame buffer 230 to display device 122. In this manner, in various embodiments the system of the present invention is able to generate output at display device 122 with minimal use of system resources such as buffers and processing power. As with the case shown in FIG. 3B, only the frame buffer 230 is used, without any need to write to an application window buffer 240, system off-screen buffer 228, or compositing buffer 229.

Figure 5A:
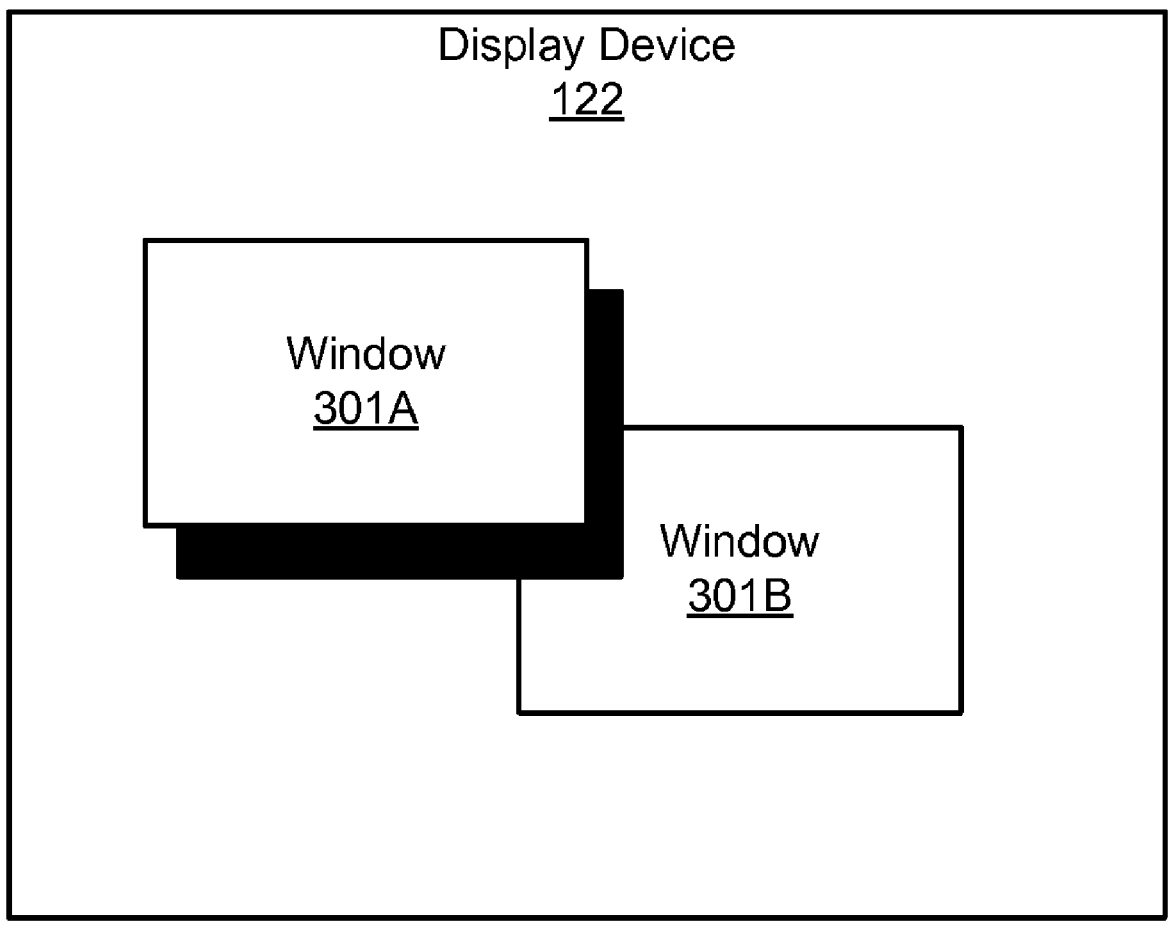
FIG. 5A depicts an example of a window's shadow effect overlapping a portion of another window on a display screen, according to one embodiment.
Figure 5B:
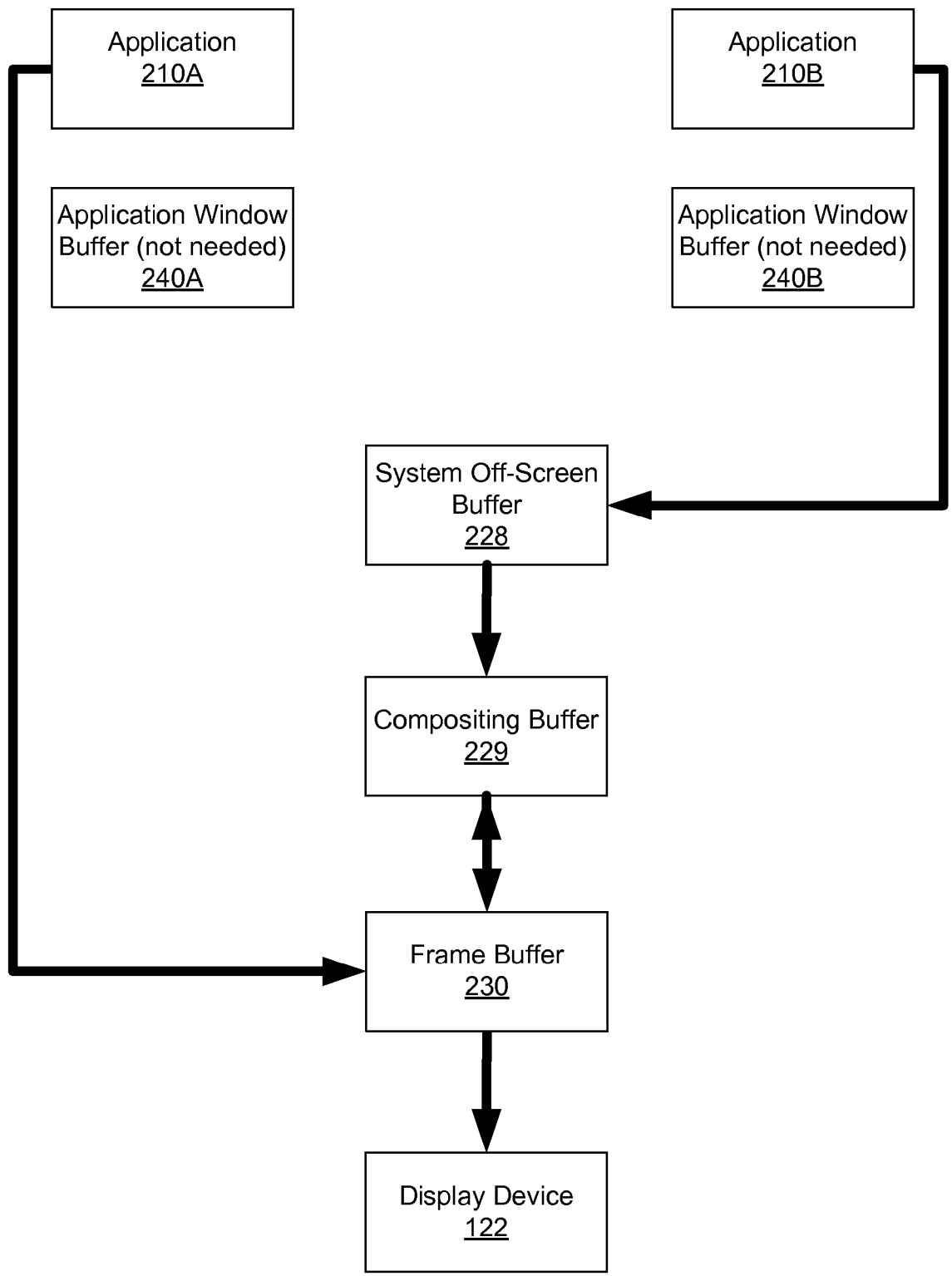
FIG. 5B is a block diagram depicting a process for drawing a window's shadow effect overlapping a portion of another window, according to one embodiment.

Referring now to FIG. 5A, there is shown an example of a window's 301A shadow effect overlapping a portion of another window 301B on a display screen, according to one embodiment. Referring also to FIG. 5B, there is shown a block diagram depicting a process for drawing a window's shadow effect overlapping a portion of another window, according to one embodiment. For clarity, some components are omitted from FIG. 5B.

Application 210A writes the contents of window 301A directly to frame buffer 230, since no part of window 301A is occluded.

Visual effects such as the shadow effect of FIG. 5A generally require compositing to be displayed properly. Accordingly, application 210B writes its output (or at least those objects within window 301B that are affected by the shadow effect) to system off-screen buffer 228. In one embodiment, windowing system 215 performs the arbitration to ensure that application 210B writes its output to the appropriate location. In another embodiment, an arbitration module (not shown) or other functional module performs the arbitration.

Window 301B (or at least those objects within window 301B that are affected by the shadow effect) is composited into compositing buffer 229 along with the shadow effect from window 301A. If necessary, data from frame buffer 230 can be copied and used for the compositing effect.

Window 301B (or at least those objects within window 301B that are affected by the shadow effect) is then copied, with the shadow effect already applied, from compositing buffer 229 to frame buffer 230. Clipping can be used to ensure that only the visible part of window 301B is copied.

FIG. 5B depicts this case by including arrows from application 210A directly to frame buffer 230, from application 210B via system off-screen buffer 228 and compositing buffer 229 to frame buffer 230, and from frame buffer 230 to display device 122.

Objects within window 301B that are unaffected by the shadow effect can be written by application 210B directly to frame buffer 230. Alternatively, such objects can be handled in the same manner as the affected objects, so that the entire window 301B is handled uniformly.

In one embodiment, if, after the geometric arrangement of on-screen elements changes, display data is needed for compositing buffer 229 for a subsequent drawing operation, the data can be copied back from frame buffer 230 to system off-screen buffer 228. This copy-back operation improves efficiency by avoiding the need for application 210A or 210B redraw relatively static display data it has drawn previously. For example, if the geometric arrangement of on-screen elements changes so that the optimized path for display data shown in FIG. 5B is no longer available for application 210A, display data previously drawn by application 210A is copied back to system off-screen buffer 228 so as to avoid the need for application 210A to redraw.

According to the techniques described herein, multiple overlapping windows with shadows can all be handled by the single system off-screen buffer 228 and compositing buffer 229.

In addition, in one embodiment the present invention ensures that when an application 210 draws an object within a window, the object need only be drawn once (unless the object itself changes). The object is drawn to either an application window buffer 240, system off-screen buffer 228, or directly to the frame buffer 230. As described above, if the display geometry changes so that a different display data path is used, the system of the present invention, in one embodiment, copies previously written display data from one buffer to another as needed, so that the application 210 need not redraw.

Figure 6A:
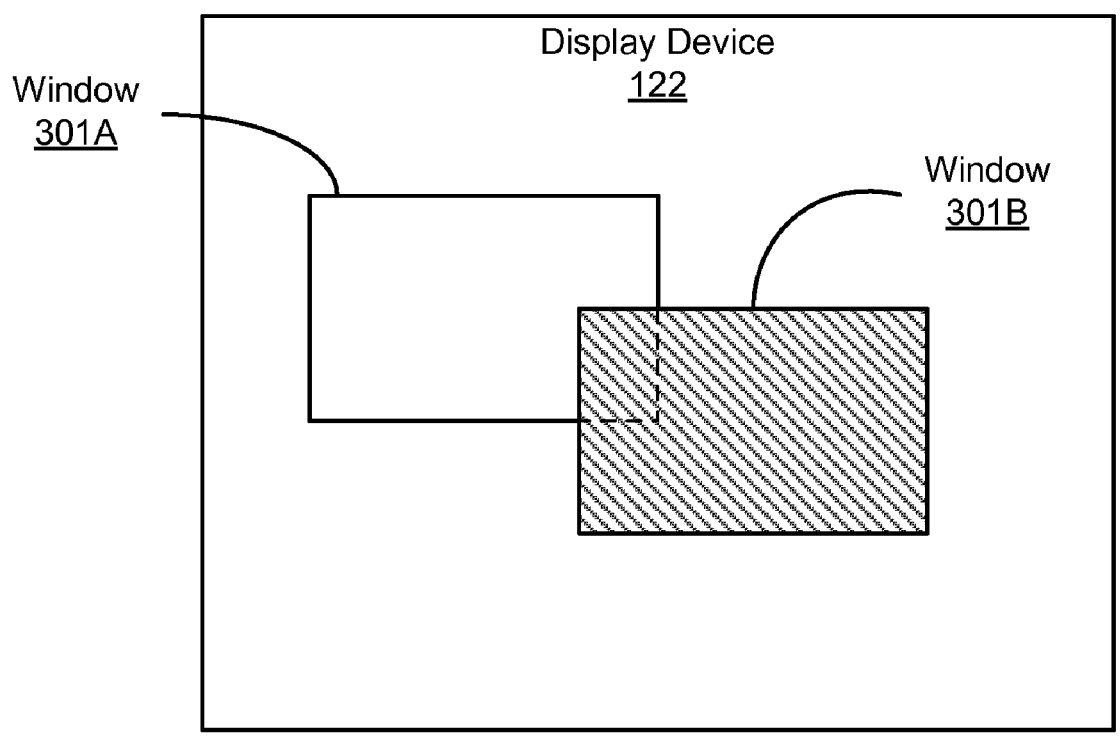
FIG. 6A depicts an example of a transparent window overlapping a portion of another window on a display screen, according to one embodiment.
Figure 6B:
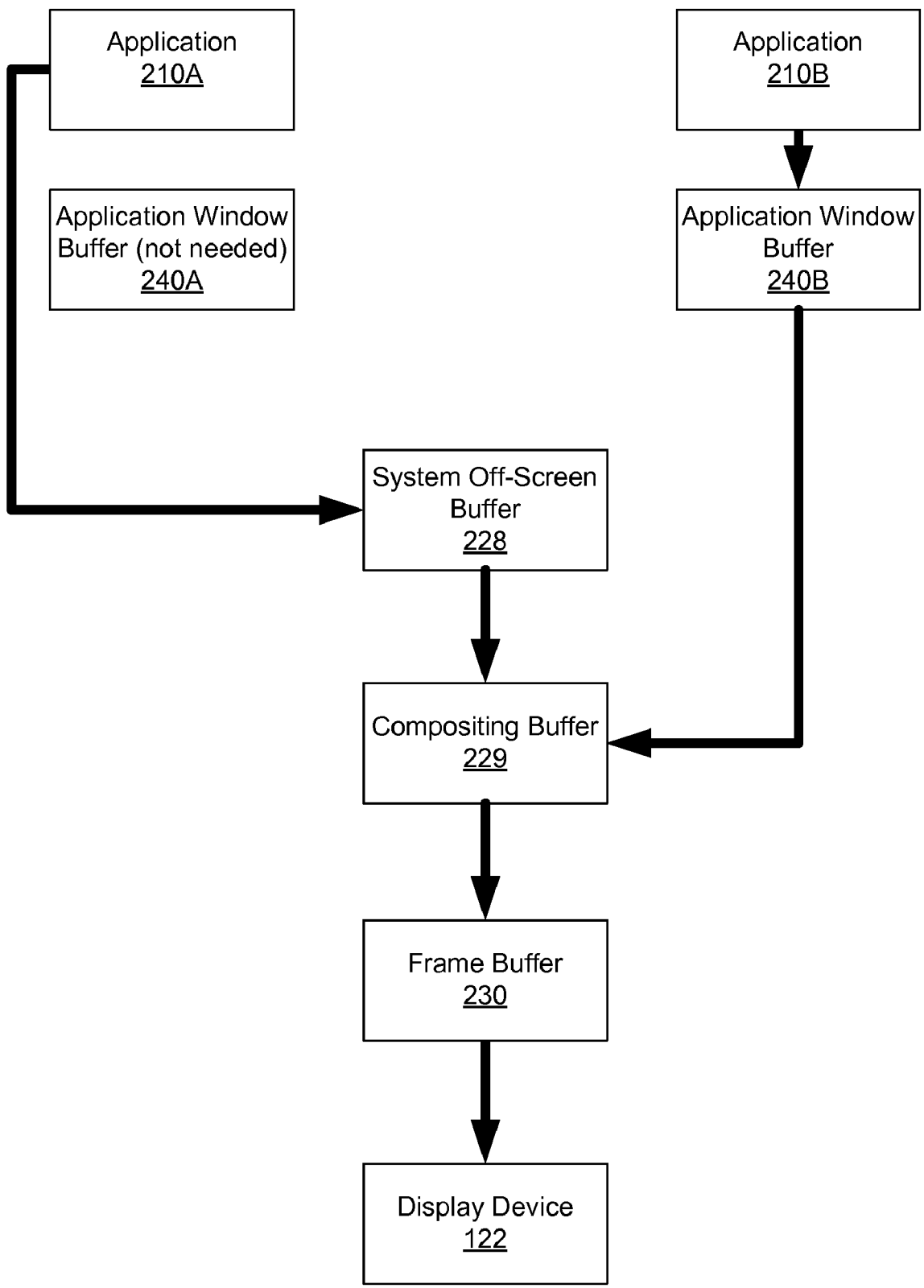
FIG. 6B is a block diagram depicting a process for drawing a transparent window overlapping a portion of another window on a display screen, according to one embodiment.

Referring now to FIG. 6A, there is shown an example of a transparent window 301B overlapping a portion of another window 301A on a display screen 122, according to one embodiment. Referring also to FIG. 6B, there is shown a block diagram depicting a process for drawing transparent window 301B overlapping a portion of window 301A, according to one embodiment.

When a visual effect such as transparency, translucency, or the like is to be used in connection with the display of windows 301, compositing buffer 229 is used as a working area. Window 301A is written to system off-screen buffer 228. Window 301B is written to application window buffer 240B that is devoted to the particular application 210B responsible for window 301B. The portions of windows 301A, 301B that are affected by the visual effect are composited together in compositing buffer 229. In one embodiment, a well known technique such as alpha compositing is used for the transparency effect. Other effects can be accomplished using other well-known methods.

The result is then copied to frame buffer 230. For greater efficiency, any changes that take place to portions of windows 301A or 301B not affected by the visual effect may be written directly to frame buffer 230 since no compositing need be done.

Display device 122 then reads frame buffer 230 when displaying output for the user.

The technique of applying visual effects in this manner can be used for per-pixel transparency (wherein each pixel of the window has its own degree of transparency), or constant transparency (wherein the entire window has the same degree of transparency), or other visual effects such as blur or the like.

Figure 7:
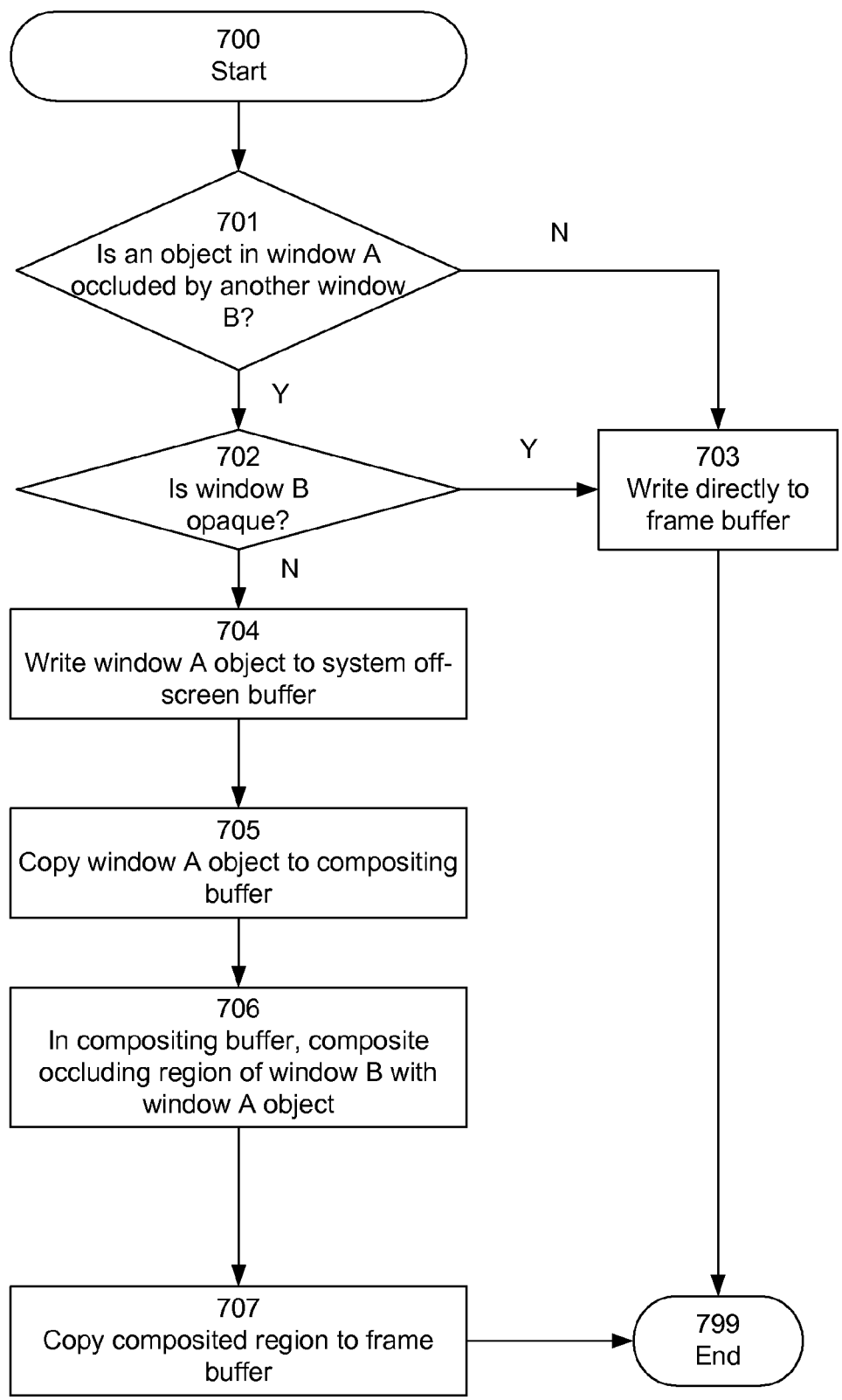
FIG. 7 is a flow diagram depicting a process for displaying windows according to one embodiment.

Referring now to FIG. 7, there is shown a flow diagram depicting a process for displaying windows 301 according to one embodiment. In one embodiment, the steps of FIG. 7 are performed by windowing system 215, although one skilled in the art will recognize that other components of the system can perform these steps.

In one embodiment, the steps of FIG. 7 are performed in response to a change in the geometric arrangement of on-screen windows. Thus, for example, if a window is moved so that it occludes another window that was not previously overlapped, the steps would be performed.

A determination is made 701 as to whether an object in window A is occluded by another window B. If not, the object in window A is written 703 directly to frame buffer 230, as depicted above in connection with FIG. 3B.

If the object in window A is occluded by another window B, a determination is made 702 as to whether window B is opaque. If so, the object in window A is written 703 directly to frame buffer 230, and clipping is used to ensure that only the non-occluded portion of the window A object is drawn. An example of this process is depicted above in connection with FIG. 4C.

If the window A object is occluded by a non-opaque window B, the window A object is written 704 to system off-screen buffer 228. The object is copied 705 from system off-screen buffer 228 to compositing buffer 229. In one embodiment, in step 705, a rectangular region encompassing the object is copied.

The occluding region of window B, having previously been written to application window buffer 240, is now composited 706, in compositing buffer 229, with the window A object that was copied in step 705. The composited window A object is then copied 707 from compositing buffer 229 to frame buffer 230 for display. An example of this process is depicted above in connection with FIG. 6B.

Figure 8:
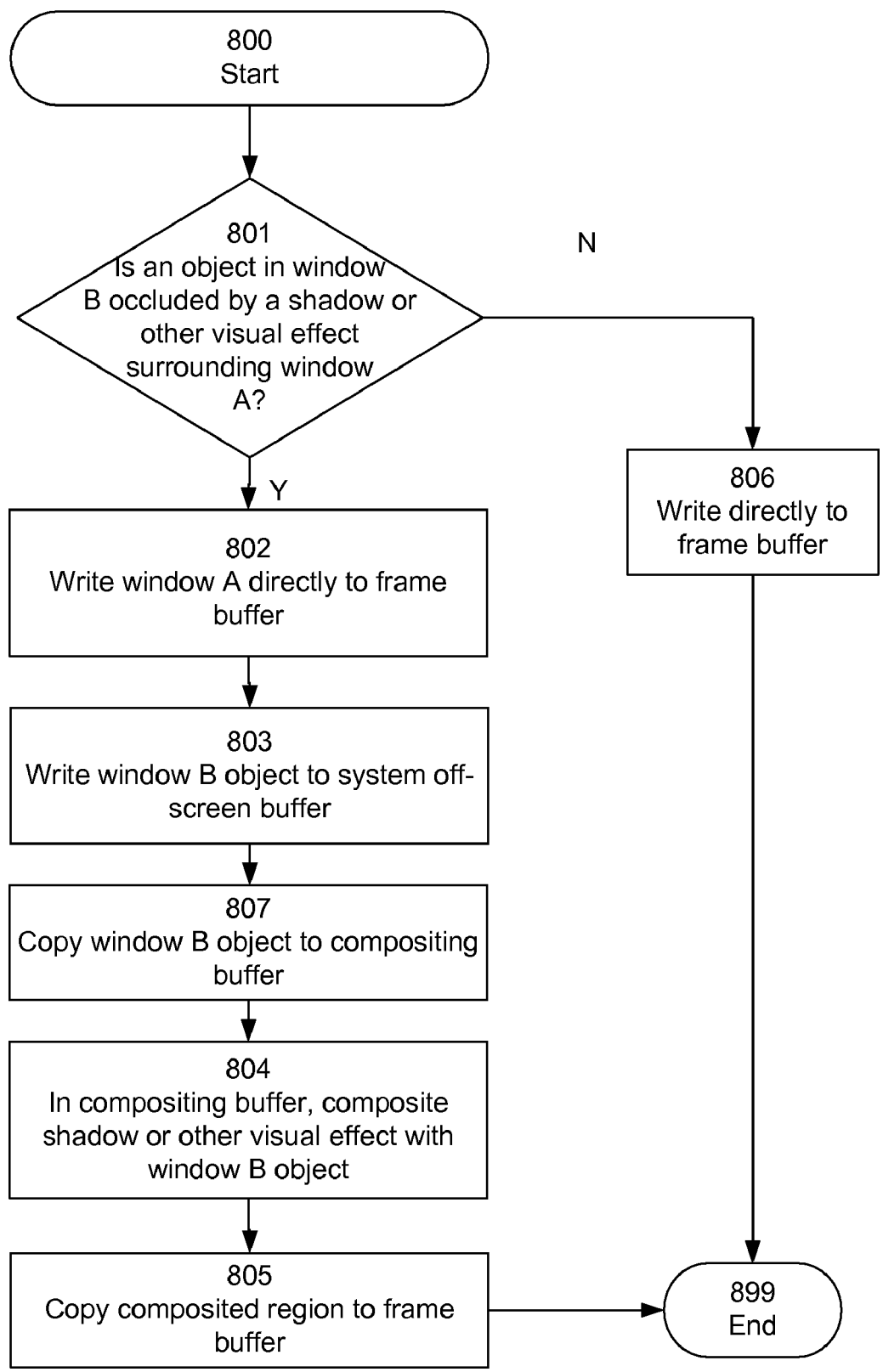
FIG. 8 is a flow diagram depicting a process for displaying a window with a shadow effect according to one embodiment.

Referring now to FIG. 8, there is shown a flow diagram depicting a process for displaying a window with a shadow effect according to one embodiment. In one embodiment, the steps of FIG. 8 are performed by windowing system 215, although one skilled in the art will recognize that other components of the system can perform these steps.

A determination is made 801 as to whether an object in window B is occluded by a shadow or other visual effect surrounding another window A. If not, the object in window B is written 806 directly to frame buffer 230.

If the object in window B is occluded by a shadow or other visual effect surrounding another window A, window A is written 802 directly to frame buffer 230 (assuming no compositing is needed as a result of other windows). In general, a shadow effect surrounding window A has no effect on the contents of window A itself, but only affects areas outside window A. Accordingly, window A can be written directly to frame buffer 230 without any additional processing.

The occluded object of window B is written 803 to system off-screen buffer 228. The object is copied 807 from system off-screen buffer 228 to compositing buffer 229. In one embodiment, in step 807, a rectangular region encompassing the object is copied.

The window B object is composited 804, in compositing buffer 229, with the shadow or other visual effect. The composited window B object is then copied 805 from compositing buffer 229 to frame buffer 230 for display. An example of this process is depicted above in connection with FIG. 5B.

In various embodiments, the present invention provides a way for transparent and opaque occlusions to be processed, and for visual effects such as shadows to be added, in an efficient manner. Individual applications 210 do not, in most cases, have to maintain their own buffers, but can use system buffers such as system off-screen buffer 228 and compositing buffer 229 as work areas to perform the additional processing required to properly implement such effects and occlusions. Accordingly, such additional capabilities can be provided for any number of applications 210 without incurring a per-application cost in terms of system resources needed.

In cases where application window buffers 240 are required, applications 210 can provide and manage such buffers 240 as they see fit. For example, to implement transparency, an application 210 can use a fixed transparency level across a window, or can vary transparency on a per-pixel basis by the use of additional memory to store per-pixel transparency values for each pixel in the window. This trade-off between memory usage and more robust transparency effects can be made on a case-by-case basis.

In one embodiment, the present invention is also able to perform transformations such as rotation, mirror imaging, scaling, cropping, and the like, at minimal cost. Specifically, when rotation (such as 90-degree) or another transformation is desired, all affected windows can be written to system off-screen buffer 228. Then, when copying data from system off-screen buffer 228 to compositing buffer 229 or to frame buffer 230, a simple rotation or other transformation can be performed on the data. A transformation module (not shown) can be included to operate on the data from system off-screen buffer 228 in order to perform the desired transformation.

In one embodiment, the present invention can be used in connection with the system and method described in related U.S. patent application Ser. No. 12/132,498, filed Jun. 3, 2008 for "Selective Access to a Frame Buffer," (attorney docket PLM5076), the disclosure of which is incorporated herein by reference. For example, in a situation where an external application, such as a media player or videogame, is attempting to draw video directly to frame buffer 230, access to frame buffer 230 can be selectively provided depending on whether or not additional processing of the video is needed. Interactions between the window containing the video data and other windows can dictate the specific buffer location to which the data should be written, according to the techniques described herein. For external applications that generate queries as to which location to write to, the appropriate memory location can be provided as described in the related patent application.

As can be seen from the above description, in various embodiments, the present invention performs window management in a robust manner while minimizing system cost in terms of memory and processing power. Common cases such as opaque overlays are handled by directly writing to a frame buffer (with clipping where needed) without the need for a separate buffer. Shadows can be handled with the use of a system off-screen buffer. More complex situations where transparent overlapping is present can be handled using a system off-screen buffer and compositing buffer.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a de-sired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A system for displaying windows generated by software applications comprising:
    a system off-screen buffer to selectively receive display data from at least one of a plurality of applications;
    a compositing buffer;
    a frame buffer; and
    a window arbitrator to:
        determine when a first window corresponding to a first application is occluded by at least a portion of a second window corresponding to a second application;
        in response to determining that the first window is occluded by at least a portion of the second window, (i) cause the first and the second applications to directly provide display data of non-occluded content within the first window and the second window to the frame buffer, respectively, and (ii) cause the first application to provide display data of occluded content within the first window to the system off-screen buffer, wherein the system off-screen buffer provides the display data of the occluded content to the compositing buffer;
    wherein the compositing buffer composites the display data of the occluded content with display data of content within at least the portion of the second window that occludes the first window to generate composited display data;
    wherein the window arbitrator causes the composited display data to be separately provided to the frame buffer.

2. The system of claim 1, wherein the arbitrator:
    determines when the first window is not occluded by the second window and the second window is not occluded by the first window; and
    in response to determining that the first window and the second window are not occluded by each other causing the first and the second applications to directly provide display data of the non-occluded content within the first window and the second window to the frame buffer, respectively.

3. The system of claim 1, further comprising:
    a transformation module to perform a transformation on the display data of the occluded content in the system off-screen buffer;
    wherein the compositing buffer receives the transformed display data of the occluded content.

4. The system of claim 3, wherein the transformation comprises at least one selected from the group consisting of:
    a rotation;
    a mirror image transformation;
    a blur;
    a per-pixel alpha transformation;
    a constant alpha transformation; and
    a scaling transformation.

5. The system of claim 1, further comprising:
    a display controller; and
    wherein once the display data of the non-occluded content within the first window and the second window and the composited display data is provided to the frame buffer, the display controller uses the display data of the non-occluded content within the first window and the composited display data to present content on a display device.

6. A method for displaying windows generated by software applications comprising:
    determining when a first window corresponding to a first application is occluded by at least a portion of a second window corresponding to a second application, the second window being at least partially transparent;
    in response to determining that the first window is occluded by at least the portion of the second window:
        providing display data of at least one non-occluded object within the first window and display data of at least one non-occluded object within the second window directly to the frame buffer;
        providing display data of at least an occluded object within the first window to a system off-screen buffer, the system off-screen buffer being available for use by a plurality of applications;
        providing display data of at least an occluding object within the second window that occludes at least the occluded object within the first window to an application window buffer corresponding to the second application;
        in a compositing buffer, compositing display data of at least a portion of the occluding object of the second window with display data of at least a portion of the occluded object of the first window to generate composited display data;
        copying the composited display data from the compositing buffer to the frame buffer; and
    displaying contents of the frame buffer on a display device.

7. The method of claim 6, further comprising
    determining when the first window is not occluded by the second window and the second window is not occluded by the first window; and
    in response to determining that the first window and the second window are not occluded by each other, providing display data of non-occluded content within the first window and display data of non-occluded content within the second window directly to the frame buffer.

8. The method of claim 6, further comprising, prior to copying the composited display data from the compositing buffer to the frame buffer, performing a transformation on data in the compositing buffer.

9. The method of claim 8, wherein the transformation comprises at least one selected from the group consisting of:
a rotation;
a mirror image transformation;
a blur;
a per-pixel alpha transformation;
a constant alpha transformation; and
a scaling transformation.

10. A method for displaying windows generated by software applications comprising:
determining when a first window corresponding to a first application is occluded by at least a visual effect surrounding at least a portion of a second window corresponding to a second application, the visual effect and the second window being opaque;
in response to determining that the first window is occluded by at least the visual effect surrounding at least the portion of the second window:
providing display data of at least one object within the second window directly to a frame buffer and display data of at least one non-occluded object within the first window directly to the frame buffer; and
providing display data for at least an occluded object within the first window to a system off-screen buffer;
in a compositing buffer, compositing display data of at least the visual effect surrounding at least the portion of the second window with display data at least a portion of the occluded object of the first window to generate composited display data;
copying the composited display data from the compositing buffer to the frame buffer; and
displaying contents of the frame buffer on a display device.

11. The method of claim 10, further comprising
determining when the first window is not occluded by the second window and the second window is not occluded by the first window; and
in response to determining that the first window and the second window are not occluded by each other, providing display data of non-occluded content within the first window and display data of non-occluded content within the second window directly to the frame buffer.

12. The method of claim 10, further comprising, prior to copying the composited display data from the compositing buffer to the frame buffer, performing a transformation on data in the compositing buffer.

13. The method of claim 12, wherein the transformation comprises at least one selected from the group consisting of:
a rotation;
a mirror image transformation;
a blur;
a per-pixel alpha transformation;
a constant alpha transformation; and
a scaling transformation.

14. A computer program product for displaying windows generated by software applications, comprising:
a non-transitory computer-readable storage medium; and
computer program code, encoded on the medium, for:
determining when a first window corresponding to a first application is occluded by at least a portion of a second window corresponding to a second application, the second window being at least partially transparent;
in response to determining that the first window is occluded by at least the portion of the second window:
providing display data of at least one non-occluded object within the first window and display data of at least one non-occluded object within the second window directly to the frame buffer;
providing display data of at least an occluded object within the first window to a system off-screen buffer, the system off-screen buffer being available for use by a plurality of applications;
providing display data of at least an occluding object within the second window that occludes at least the occluded object within the first window to an application window buffer corresponding to the second application;
in a compositing buffer, compositing display data of at least a portion of the occluding object of the second window with display data of at least a portion of the occluded object of the first window to generate composited display data;
copying the composited display data from the compositing buffer to the frame buffer; and
displaying contents of the frame buffer on a display device.

15. The computer program product of claim 14, further comprising computer program code for
determining when the first window is not occluded by the second window and the second window is not occluded by the first window; and
in response to determining that the first window and the second window are not occluded by each other, providing display data of non-occluded content within the first window and display data of non-occluded content within the second window directly to the frame buffer.

16. The computer program product of claim 14, further comprising computer program code for, prior to copying the composited display data from the compositing buffer to the frame buffer, performing a transformation on data in the compositing buffer.

17. The computer program product of claim 16, wherein the transformation comprises at least one selected from the group consisting of:
a rotation;
a mirror image transformation;
a blur;
a per-pixel alpha transformation;
a constant alpha transformation; and
a scaling transformation.

18. A computer program product for displaying windows generated by software applications, comprising:
a non-transitory computer-readable storage medium; and
computer program code, encoded on the medium, for:
determining when a first window corresponding to a first application is occluded by at least a visual effect surrounding at least a portion of a second window corresponding to a second application, the visual effect and the second window being opaque;
in response to determining that the first window is occluded by at least the visual effect surrounding at least the portion of the second window:
providing display data of at least one object within the second window directly to a frame buffer and display data of at least one non-occluded object within the first window directly to the frame buffer; and
providing display data at least an occluded object within the first window to a system off-screen buffer;
in a compositing buffer, compositing display data of at least the visual effect surrounding at least the portion of the second window with display data at least a portion of the occluded object of the first window to generate composited display data;

copying the composited display data from the compositing buffer to the frame buffer; and displaying contents of the frame buffer on a display device.

19. The computer program product of claim 18, further comprising computer program code for:

determining when the first window is not occluded by the second window and the second window is not occluded by the first window; and in response to determining that the first window and the second window are not occluded by each other, providing display data of non-occluded content within the first window and display data of non-occluded content within the second window directly to the frame buffer.

20. The computer program product of claim 18, further comprising computer program code for, prior to copying the composited display data from the compositing buffer to the frame buffer, performing a transformation on data in the compositing buffer.

21. The computer program product of claim 20, wherein the transformation comprises at least one selected from the group consisting of:

a rotation;
a mirror image transformation;
a blur;
a per-pixel alpha transformation;
a constant alpha transformation; and
a scaling transformation.

* * * * *

UNITED STATES PATENT AND TRADEMARK OFFICE
CERTIFICATE OF CORRECTION

PATENT NO. : 8,384,738 B2
APPLICATION NO. : 12/203098
DATED : February 26, 2013
INVENTOR(S) : Paul Mercer It is certified that error appears in the above-identified patent and that said Letters Patent is hereby corrected as shown below:

In the Claims:

In column 14, line 62, in Claim 18, delete "at" and insert -- for at --, therefor.

Signed and Sealed this
Twenty-seventh Day of August, 2013

Teresa Stanek Rea
*Acting Director of the United States Patent and Trademark Office*